United States Patent [19]
Strydom

[11] 3,955,406
[45] May 11, 1976

[54] NON-DESTRUCTIVE HARDNESS TESTING OF ARTICLES SUCH AS CIGARETTES

[75] Inventor: Mauritz L. Strydom, Stellenbosch, South Africa

[73] Assignee: Tobacco Research and Development Institute Limited, Zug, Switzerland

[22] Filed: June 10, 1974

[21] Appl. No.: 477,749

[30] Foreign Application Priority Data
June 12, 1973 South Africa.................... 73/3954
Jan. 31, 1974 South Africa.................... 74/0651

[52] U.S. Cl. .................... 73/78; 73/37.5; 73/94
[51] Int. Cl.² .................... G01N 3/10; G01B 13/08
[58] Field of Search .................... 73/38, 78, 94, 149, 73/37, 41.2, 45.5

[56] References Cited
UNITED STATES PATENTS

| | | | |
|---|---|---|---|
| 1,796,489 | 3/1931 | Sturcke.............................. | 73/37 |
| 2,550,701 | 5/1951 | Lardy................................ | 73/401 X |
| 2,821,851 | 2/1958 | Daley................................ | 73/37 |
| 2,970,041 | 1/1961 | Burlis et al........................ | 73/149 UX |
| 3,115,772 | 12/1963 | O'Keefee et al.................. | 73/94 |
| 3,182,497 | 5/1965 | Rubens et al..................... | 73/149 |
| 3,668,928 | 6/1972 | Strydom........................... | 73/78 |

Primary Examiner—James J. Gill
Assistant Examiner—John S. Appleman
Attorney, Agent, or Firm—Young & Thompson

[57] ABSTRACT

Apparatus for the non-destructive hardness testing of an article such as a cigarette. The article is placed in an elastic sleeve and surrounded by a liquid, the level of which may be determined through a gauge tube. The interior of the article is then subjected to two different reduced pressures and the resulting volumetric change of the article is determined from the gauge tube at each reduced pressure. The hardness of the article is then calculated by means of a suitable formula.

2 Claims, 2 Drawing Figures

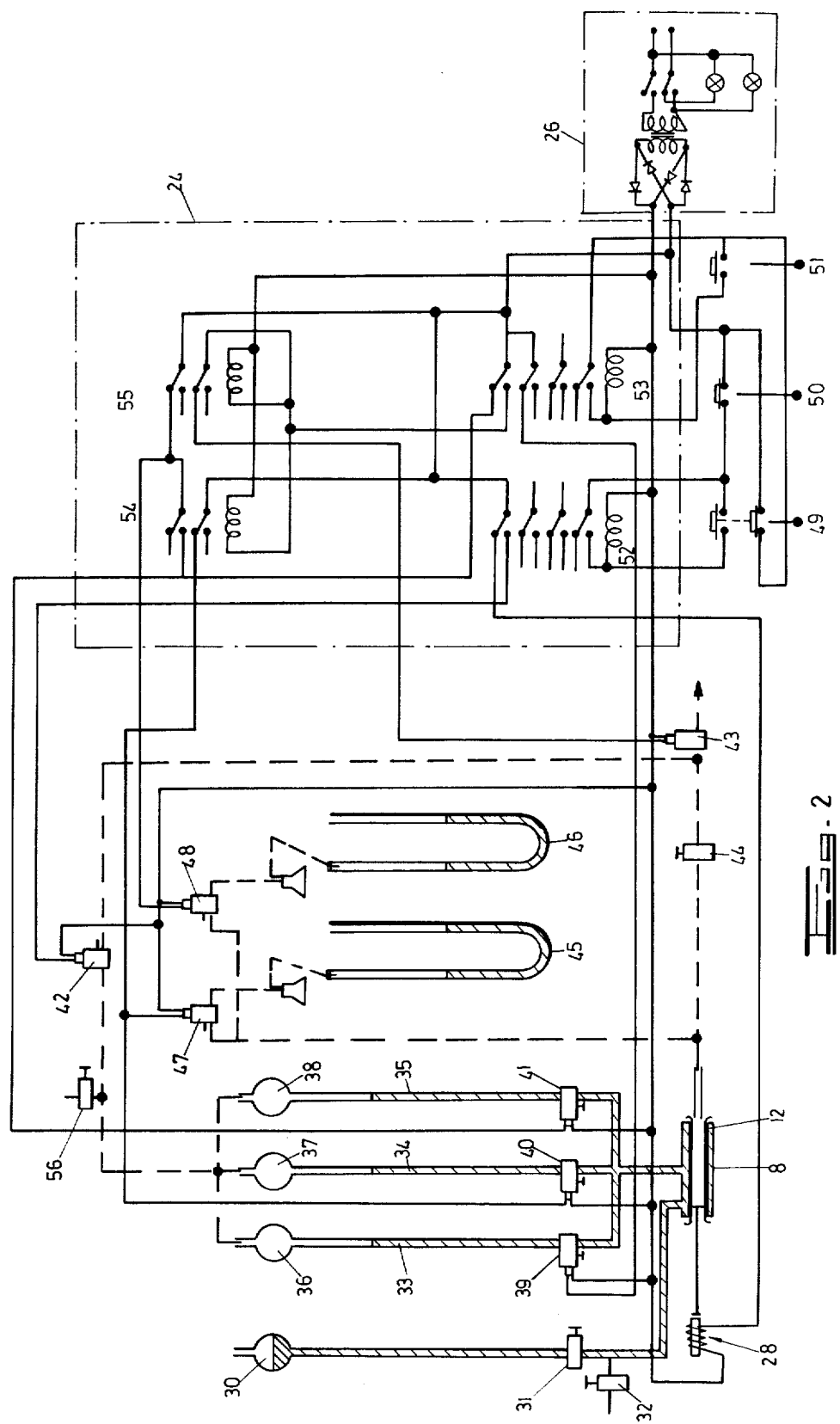

NON-DESTRUCTIVE HARDNESS TESTING OF ARTICLES SUCH AS CIGARETTES

THIS invention relates to the non-destructive testing of gas permeable articles, such as cigarettes.

A method for measuring the firmness or hardness of a cigarette is known in which the cigarette is subjected to an external pressure and the amount of air expelled from the cigarette is measured. From the known values of the applied pressure and the amount of air expelled, the firmness of the cigarette is calculated. See in this regard U.S. Pat. No. 3,115,772 (O'Keeffe).

This method relies on liquid pressure and on the measurement of the small amount of gas expelled from the cigarette.

It has also been proposed to do what might be termed the inverse of the above method in which a pneumatic suction is applied to the interior of the cigarette and the volumetric change of the cigarette under the suction is measured. In this method, the hardness or firmness of the cigarette is tested by inserting it into a rubber sleeve which is surrounded by rings. Air is passed through the annuli formed between the cigarette and the rings. The pressure drop is measured firstly with the cigarette interior as is, secondly with the interior subjected to a first suction. The pressure drops are measures of the diameters of the cigarette at the various interior loadings. From these diameters and the loadings the hardness of the cigarette may be computed. See in this regard U.S. Pat. No. 3,668,928.

This method requires sophisticated and expensive equipment which can only be used by skilled personnel under laboratory conditions. Of course, under such conditions it is accurate and very useful. As a practical matter the prior proposal is a research tool and not much use on the production floor where quick results are required to feed back information for production purposes.

According to the invention, for the non-destructive testing of a gas permeable article a pneumatic suction is applied to the interior of the article and the volumetric change of the article during the suction is measured, a measure of a property of the article being derived from the volumetric change and the suction applied, the invention being characterized in that the article is surrounded by a liquid and the change in the level of the surrounding liquid is taken as a measure of the volumetric change of the article.

The article may be subjected to at least two different suctions, the level of the liquid being determined at the application of each suction.

The method may include the further step of enclosing the article in an elastic sleeve, for example, if the article is a cigarette, in order to protect the cigarette from the liquid.

The method performed by the apparatus of the invention includes the further steps of providing a plurality of gauge tubes in communication with the filled space, applying successive different loadings to the cigarette, and successively blocking the communication between the liquid filled space and the liquid in each gauge tube at the different loadings.

Also according to the invention there is provided an apparatus for the non-destructive testing of an article such as a cigarette, the apparatus having an elastic sleeve for enclosing the article to be tested and means for applying a pneumatic suction to the interior of the article, characterized in that the apparatus has a space around the sleeve adapted to be filled with a liquid and a gauge tube in communication with the space and adapted to be partly filled with a liquid, the level of the liquid in the gauge tube serving as an indication of volumetric changes of the article under various pneumatic suctions.

Further according to the invention the device includes a plurality of gauge tubes and means to shut off the different gauge tubes at the different pneumatic suctions.

The invention is further discussed, by way of example, with reference to the accompanying drawings, in which:

FIG. 2 is a circuit diagram for an embodiment of the invention which includes a plurality of gauge tubes.

Figure 1:
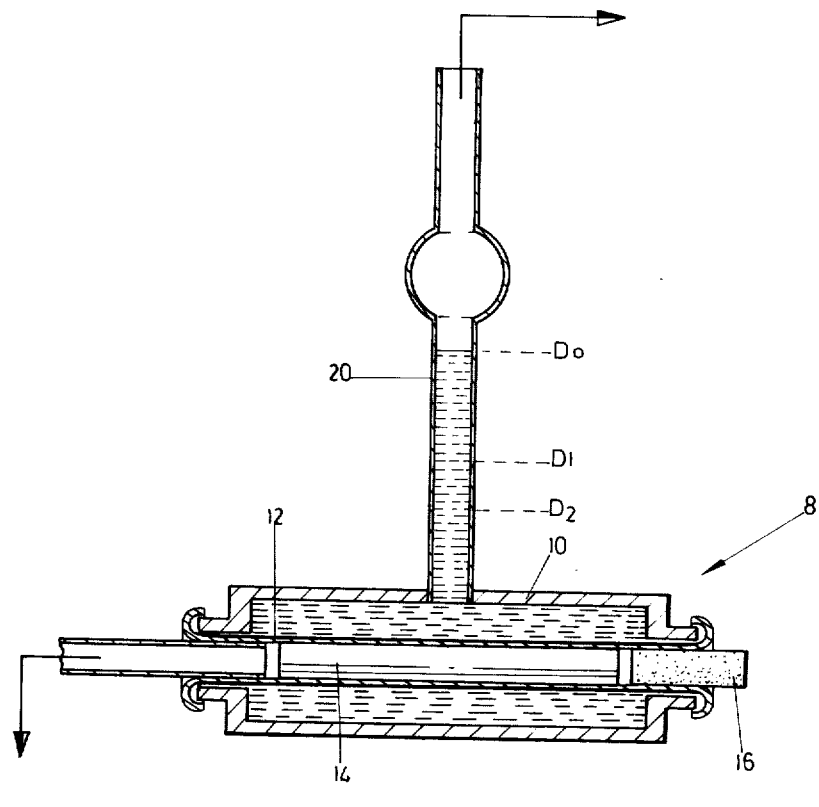
FIG. 1 is a section through a device according to the invention.

Referring to FIG. 1 there is shown a non-destructive testing device 8 for testing the hardness of cigarettes. The device comprises a cylinder 10 horizontally oriented, and having its ends closed except in the centre of each end where a hole is provided to accommodate a thin stretched rubber tube 12. The inside diameter of the rubber tube is slightly smaller than that of the diameter of a cigarette 14 to be measured. The interior of the tube is connected to a vacuum source (not shown). A manometer (not shown in FIG. 1) is provided to measure the vacuum pressure.

One end of the rubber tube 12 is closed off by a plug 16, while the other end is connected to the vacuum source. A vertical gauge tube 20, which is a transparent pipe provided with a bulb, is fluid connected at one end to the space inside the cylinder 10 and the other end is connected to a second vacuum source (not shown). A liquid, such as coloured water is provided in the space inside the cylinder 10 and partially fills the gauge tube.

In use, vacuum is applied to the upper end of the gauge tube which exerts a suction on the rubber tube 12 causing it to expand. A cigarette is inserted into the expanded tube. The suction is released and the liquid settles around the cigarette; this gives a zero reading, Do, for the cigarette. A vacuum P1 is then applied to the cigarette from the source 18 and the decrease in diameter D1 is read off the gauge tube. A second and higher vacuum P2 is applied and the change in diameter D2 again read off. Provision must be made to take the force of the elastic tube and the head of the column of liquid into consideration when determining the zero diameter Do of the cigarette when no suction is applied to its interior.

Because a cigarette or filter rod is not a truly elastic body, the sequence of operations must be time based in the sense that for results to be duplicated the various readings must be taken at fixed intervals apart. The absolute value of the intervals is not material so long as they remain the same for the same series of tests. Likewise the absolute values of the suction forces are not material. They may be different and need not necessarily be the same for the same series of tests. It is preferred to keep them the same for the sake of convenience. In practice suctions of 3 and 7 p.s.i. have been used with success.

The hardness or elasticity of a cigarette may be determined by an adaptation of the formula in U.S. Pat. No. 3,668,928, which follows:

$$H = \frac{P_2 - P_1}{D_1 - D_2} \times D_0$$

Where

H = Hardness or Elasticity $P_1$ and $P_2$ = Force or vacuum applied to the cigarette.

$D_0$, $D_1$ and $D_2$ = corresponding diameters of the cigarette when no suction is applied, and at P1, and P2 respectively.

The apparatus is very simple and can be built in a few hours. Essentially the device requires no sophisticated auxiliary appliances — all that is needed is a source of suction, a pressure gauge and means to control the suction source.

The hardness calculation is a simple arithmetical problem. Thus needed information can be quickly obtained and utilized for making adjustments in production.

In order to determine the hardness of a cigarette or filter with the device described above, readings of volumetric displacement can only be read when the manometer is stationary. It has, however, been found that readings of P1 and P2 and D1 and D2 must be taken under dynamic conditions, i.e. during the time of volumetric change to ensure more accurate readings. In the present example, the tube 20 is calibrated so that the diameter of the cigarette may be read off directly. However, if desired the tube 20 may be calibrated so that the volume of the cigarette may be read off.

The device which is now described with reference to FIG. 2 provides a method of switching that freezes the various manometer readings for visual interpretation.

In the drawing there is shown a device 8 substantially as hereinbefore described which has a liquid supply from a reservoir 30 provided with two bleed valves 31 and 32. Connected to the device 8 are three gauge tubes 33, 34 and 35 each having reservoirs 36, 37 and 38 respectively. Solenoid valves 39, 40 and 41 are provided for opening and closing the tubes. The top of each of the tubes is connected to a vacuum source through solenoid valves 42 and 43. The cigarette enclosing rubber tube 12 is connected to the same vacuum source through a needle valve 44 and the solenoid valve 43. Manometers 45 and 46 through solenoid valves 47 and 48, respectively, are connected to measure the vacuum applied to the rubber tube 12.

The solenoid valves 39 to 43 and 47 and 48 are energised through a control circuit 24 provided with three pushbutton switches 49, 50 and 51. A power source 26 feeds current to the control circuit 24.

The control circuit 24 includes two relays 52 and 53, and two delay timers 54 and 55 controlled by the relays.

A solenoid coil 28 is provided to lock a plug in a fixed position in the rubber tube 12, the coil being energised through the control circuit.

In use, the switching device operates as follows:

Initially the solenoid valves 39, 40, 41, 47 and 48 are all open,

1. The push-button 49 is depressed to energise the relay 52 which latches on to one of its own contacts. The valve 43 is energised to open to the valve 42 which is also opened; this allows vacuum to be applied to suck up liquid in the tubes 33, 34 and 35 into reservoirs 36, 37 and 38 in order to open the rubber tube 12 so that a cigarette may be inserted.

2. The push-button 50 is then depressed. This releases the relay 52 which de-energises the valve 42 allowing air to leak into the tops of the gauge tubes via a bleed valve 56 releasing the vacuum on the rubber tube so that liquid settles around the cigarette. At this stage the height of liquid in the tubes 33, 34 and 36 registers the zero pressure.

3. The push-button 51 is depressed energising the relay 53 which is self latched through the lower part of push button 49. This causes:

a. de-energising and closing of the valve 39 which freezes the zero reading in the tube 33.

b. the valve 41 to be also energised and closed, c. the valve 43 to be energised changing the vacuum supply from the valve 42 through the needle valve 44 to the inside of the rubber tube 12, and to the manometers 45 and 46. The valve 44 controls the rate of supply of vacuum, d. timers 54 and 55 to be started.

After a time interval 54 operates de-energising the valves 40 and 47 which both close freezing the readings in the tube 34 and the manometer 45. The valve 41 is opened.

After a further time interval (after 54 has operated), 55 operates. This causes the valves 41 and 48 to be de-energised and closed to freeze the readings in the tube 35 and the manometer 46.

At this stage the readings in the gauge tubes and manometers are taken.

In order to release and reset the system the pushbutton 49 is depressed. This releases the relay 53, and de-energises the timers 54 and 55 and the valves 39 to 41. The relay 52 is closed energising the plunger 28 to withdraw the plug and open the tube 12 so that the cigarette may be removed and another inserted for testing.

In this specification the term "rubber sleeve" is defined to include natural and synthetic rubbers.

I claim:

1. Apparatus for the testing of a compressible article, comprising a chamber for containing a liquid, an elastic sleeve fluidtightly spanning the chamber and adapted slidably to receive the article therein, one end of the sleeve being open, means to close off the other end of the sleeve, a plurality of gauge tubes in communication with the interior of the chamber and extending upwardly from the chamber, a liquid filling the chamber outside the elastic sleeve and partially filling the gauge tubes, means to shut off different gauge tubes from the chamber when different degrees of suction are applied to the interior of the sleeve and means to withdraw air through said open end of the sleeve so that when an article is inserted into the sleeve and air is withdrawn from the sleeve, the sleeve compresses the article and contracts and the level of liquid in any gauge tube in communication with the chamber falls to indicate the volumetric change in the article.

2. Apparatus as claimed in claim 1, said means to withdraw air from the sleeve including a conduit connected to said open end of the sleeve.

* * * * *